United States Patent
Barth et al.

(10) Patent No.: US 6,962,042 B2
(45) Date of Patent: Nov. 8, 2005

(54) NON WOVEN TEXTILE STRUCTURE INCORPORATING STABILIZED FILAMENT ASSEMBLIES

(75) Inventors: Georg Martin Barth, Rengsdorf (DE); Edmund Hugh Carus, Clitheroe (GB)

(73) Assignee: Vliesstoff-Technologie in 3. Dimension KG, Newied (DE)

( * ) Notice: Subject to any disclaimer, the term of this patent is extended or adjusted under 35 U.S.C. 154(b) by 141 days.

(21) Appl. No.: 10/271,766

(22) Filed: Oct. 17, 2002

(65) Prior Publication Data

US 2003/0036329 A1 Feb. 20, 2003

Related U.S. Application Data

(63) Continuation-in-part of application No. PCT/GB00/01510, filed on Apr. 18, 2000.

(51) Int. Cl.$^7$ ............................................... D02G 3/38
(52) U.S. Cl. ............................................................ 57/5
(58) Field of Search ............................. 57/3, 5, 6, 310, 57/210, 224–228, 233, 235, 259, 260

(56) References Cited

U.S. PATENT DOCUMENTS

| | | | | |
|---|---|---|---|---|
| 2,217,826 | A | * | 10/1940 | Van Laer .......................... 87/6 |
| 3,628,224 | A | | 12/1971 | Murotani et al. |
| 3,675,409 | A | | 7/1972 | Rosenstein |
| 3,769,787 | A | * | 11/1973 | Rosenstein et al. ............. 57/227 |
| 4,079,568 | A | | 3/1978 | Wortman |
| 4,621,489 | A | * | 11/1986 | Okada ............................ 57/210 |
| 4,639,253 | A | | 1/1987 | Dyer et al. |
| 4,720,943 | A | * | 1/1988 | Arrant ............................ 57/210 |
| 4,729,215 | A | * | 3/1988 | Sato et al. ..................... 57/210 |
| 4,863,776 | A | | 9/1989 | Sternlieb |
| 4,869,059 | A | * | 9/1989 | Austin ............................ 57/210 |
| 5,568,719 | A | * | 10/1996 | Proctor .......................... 57/225 |
| 5,736,219 | A | | 4/1998 | Suehr et al. |
| 5,826,421 | A | * | 10/1998 | Wilcox et al. ................. 57/210 |
| 2002/0026699 | A1 | | 3/2002 | Hayashi et al. |
| 2002/0028624 | A1 | | 3/2002 | Mizutani et al. |
| 2002/0029023 | A1 | | 3/2002 | Furuya et al. |
| 2002/0029024 | A1 | | 3/2002 | Furuya et al. |
| 2002/0029025 | A1 | | 3/2002 | Furuya et al. |
| 2002/0029026 | A1 | | 3/2002 | Furuya et al. |
| 2002/0049419 | A1 | | 4/2002 | Mizutani et al. |

FOREIGN PATENT DOCUMENTS

DE  513 876  12/1930
EP  0 053 700 A1  6/1982

(Continued)

OTHER PUBLICATIONS

Hatch, Textile Science, West Publishing Company, 1st Edition, pp. 362-364.*

Primary Examiner—John J. Calvert
Assistant Examiner—Shaun R. Hurley
(74) Attorney, Agent, or Firm—Oliff & Berridge, PLC

(57) ABSTRACT

A plurality of substantially parallel continuous filaments, e.g. of cellulose acetate or rayon, and preferably newly formed, are consolidated or partially stabilized, e.g. by application of solvent and pressure, by hydroentanglement, by embossing, or by crimping and stretching. The filament assembly or subassemblies thus produced are further stabilized by folding, bundling, twisting or intertwining, e.g. to form braids (10), and are then bonded to a carrier layer or sandwiched between outer layers (12, 14), e.g. by hydroentanglement, melt blowing, spinbonding etc. The stabilized filament assemblies may be arranged spaced transversely and may be cut just prior to bonding so as also to provide longitudinally spaced three dimensionally thicker regions, ready for conversion to finished products such as absorbant feminine hygiene products or medical swabs or the like.

4 Claims, 2 Drawing Sheets

FOREIGN PATENT DOCUMENTS

| | | |
|---|---|---|
| EP | 0 391 814 A2 | 10/1990 |
| EP | 0 705 932 A2 | 4/1996 |
| GB | 1105968 | 3/1968 |
| GB | 1 387 566 | 3/1975 |
| GB | 1 535 264 | 12/1978 |
| WO | WO 96/00550 | 1/1996 |
| WO | WO 99/27876 | 6/1999 |
| WO | WO 99/27879 | 6/1999 |
| WO | WO 99/30661 | 6/1999 |
| WO | WO 00/56258 | 9/2000 |
| WO | WO 01/72253 A1 | 10/2001 |

* cited by examiner

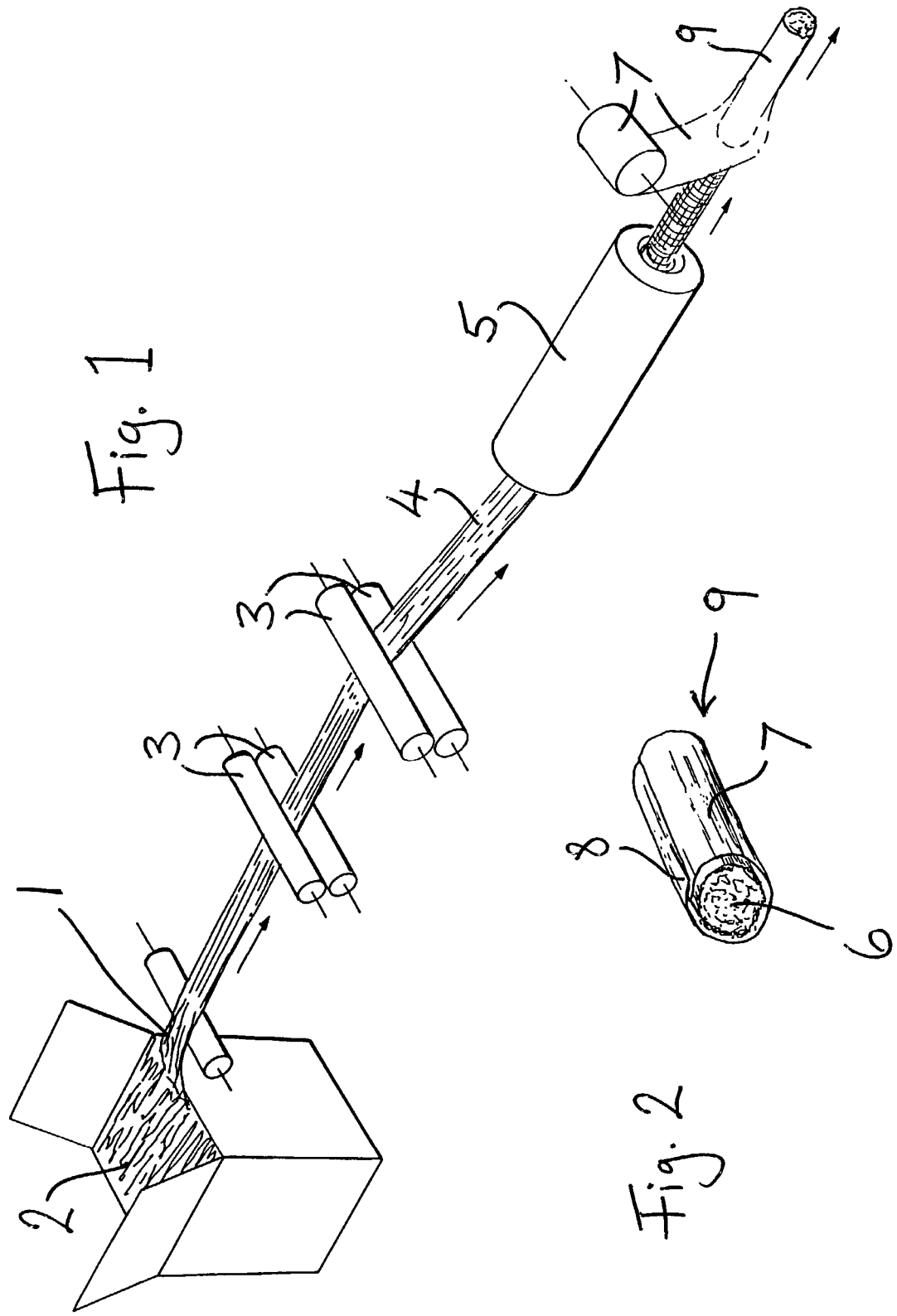

NON WOVEN TEXTILE STRUCTURE INCORPORATING STABILIZED FILAMENT ASSEMBLIES

This application is a continuation-in-part of International Patent Application No. PCT/GB00/01510 filed 18 Apr. 2000.

FIELD OF THE INVENTION

The present invention relates to nonwoven textile materials and in particular to composite absorbent textile materials.

The present invention has particular application to absorbent textile materials or structures for uses in the fields of sanitary protection, infant care and adult incontinence protection.

BACKGROUND ART

Nonwoven materials made by many different processes have been utilized as components to produce absorbent materials for use in feminine hygiene, infant diapers and incontinence products. Modern technologies utilizing fluff pulp structures, often combined with other non-woven materials to form multilayer composite, have been used to facilitate fluid capture, distribution and containment. Other materials such as superabsorbent polymers are often incorporated in these composites to maximize fluid containment.

WO 99/27876, WO 99/27879, WO 99/30661, WO 00/56258 and WO 01/72253 A1, (SCA Hygiene Products AB) and US 2002/0026699A1, US 2002/0029026A1, US 2002/0028624A1, US 2002/0029023A1, US 2002/0029024A1, US 2002/0029025A1 and US 2002/0049419A1 (Uni-Charm Corporation) all describe use of filament "tows" as a fluid acquisition material in infant diapers and the like but as only one component in the absorbent matrices specified. More particularly, these specifications disclose production of a layer or layers of continuous "tow" filaments which are bonded in various ways and which may be of cellulose acetate, or of polyethylene, polypropylene, polyamide, polyester, polyvinyl acetate, viscose or rayon, or bi-component polymers. Steps in production of said layer can include crimping or curling, then stretching and distributing the "tow" filaments in various ways, then bonding same in a pattern of lines, spots or points by any suitable technique including thermal or ultrasonic bonding, calendering, laser or print-bonding or undefined hydroentanglement. The filaments are cut to length either before or after the aforesaid bonding. Optionally in some cases, the "tow" filaments can be bonded, at the same time as the pattern of bonding mentioned above, to a liquid containment layer which can be a non-woven composite material. In some cases, some further details are provided of the method of handling the "tow" filaments to produce a finished layer or layers. The prior art describes conventional bonding of tow filaments by various techniques, all of which depress the performance of such tow assemblies by capillary blockage at points of bonding.

OBJECT OF THE INVENTION

The object of this new invention is to provide an improved manner of handling continuous filaments to facilitate their incorporation into a finished product which has enhanced properties, e.g. of absorbency and/or fluid management, compared to known products.

SUMMARY OF THE INVENTION

A method of producing a non-woven textile structure is now proposed which comprises the steps of initially consolidating a plurality of substantially parallel continuous filaments to provide a partially stabilized filament assembly, further constraining said filament assembly by, for example, bundling or twisting operations, and incorporating one or more of the resulting constrained filament assemblies into a composite, e.g. by bonding to a carrier layer or layers.

In the finished product, where the filament material is absorbent, significant improvements in fluid management, notably wicking and fluid containment are apparent over existing materials currently utilized and known to those skilled in the art. This is because the processing of the filament assembly is such as to maintain substantially uninterrupted capillarity along its entire length.

In accordance with the present invention the two-stage processing of the filament assemblies or tows can be reduced to a stretching and shaping treatment. Multifilament rods or bundles of chosen size and cross-sectional shape can be produced from bales of crimped tow by stretching such tow and by subsequent consolidation of same into bundles of round or oval or oblong cross-section which exhibit uninterrupted capillarity along their entire length.

Structural stabilization of these filament bundles, which may be in practice resemble cigarette-type filter rods, can optionally, indeed preferably, be maintained by a simple fluid permeable wet-strength wrap material, for instance a highly porous nonwoven material.

The composition of such tow filament assemblies can, of course, be selected for optimum end-use performance.

The size of the consolidated filament bundles or rods is dependent on the end use of the products containing same and the nature of the fluids being considered for entrapment. These consolidated filament bundles or rods can be positioned in controlled spaced apart arrays across the finished composites with one or more nonwoven outer layer(s) providing the full composite finished width.

Whilst any polymer filaments which can be rendered hydrophilic can be considered applicable for production of these three-dimensional consolidated bundles or rods, either alone or with other polymers to form blended filament assemblies, the preferred polymer is cellulose acetate which achieves outstanding fluid take up and wicking properties. Staple cellulose acetate fibre has been used in non-woven fabrics in the past and reported in literature by Celanese Acetate LLC and other sources such as Kimberly-Clark but such non-woven materials have been conventional web-like structures without the use of shaped bundles or rods of filaments. Solvent spun rayons, as produced for example by Lenzing AG and Acordis Plc, are also a favourable option.

The fluid management performance of filament assemblies produced in accordance with the invention can be optimised by the careful selection of filament diameters and packing density. Mixtures of coarser and finer filaments may be advantageous since filament spacing and the presence of capillaries are required for optimum fluid management. In this regard, the use, in the assemblies of the invention, of filaments which have "Y" shaped or "stellar" shaped cross-section or the like may be advantageous since the crevices running along such shaped filaments act like fine capillary structures thus enhancing fluid wicking and full utilisation of the composite structures.

Many well known nonwoven technologies are suitable for bonding such consolidated filament bundles or rods to a carrier layer of fibres, filaments or a non-woven web made from similar material to the consolidated filament assemblies themselves. These include known processes whereby pulp fibres can be blown onto and around consolidated filament assemblies produced according to the invention. The positioning of these consolidated assemblies in absorbent composite structures can be enhanced by the use of binding agents or binding fibres. The latter may be bicomponent fibres such as sheath/core or side by side types as known in airlaid structures or they may be related melt blown fibres and used in Kimberley-Clark "COFORM" materials. In these cases previous inadequate fluid wicking is overcome due to the three-dimensional structure of the compacted multifilament rods or bundles of the invention coupled with the presence of long filaments and uninterrupted capillarity.

The consolidated multi-filament rods or bundles of the invention are advantageous when combined with other materials, for example fluff-pulp/superabsorbent airlaid fluid containment composites as currently used in hygiene applications since the filament rods/bundles facilitate fluid transfer to all parts of the total composite. The traditional approach is to use a nonwoven layer to facilitate fluid flow to the fluff-pulp/superabsorbent layer. However, nonwoven layers used to date tend to intrinsically "lock" fluids in place and prevent effective total absorbent composite utilization, particularly on second and third fluid insults. When the consolidated filament rods or bundles of the invention are positioned above or more preferably with a fluff-pulp/superabsorbent medium (but with one edge available to receive fluid immediately on insult) the uninterrupted capillarity of such bundles or rods allows for effective and maximized utilization of such composites.

BRIEF DESCRIPTION OF THE DRAWINGS

The invention will be exemplified by reference to the accompanying drawings, in which:

FIG. 1 is a sketch illustrating apparatus used for the production of an embodiment of consolidated three-dimensional filament rods in accordance with the invention;

FIG. 2 is a perspective, partial sketch of the product of the apparatus of FIG. 1;

DETAILED DESCRIPTION OF PREFERRED EMBODIMENTS

Figure 3:
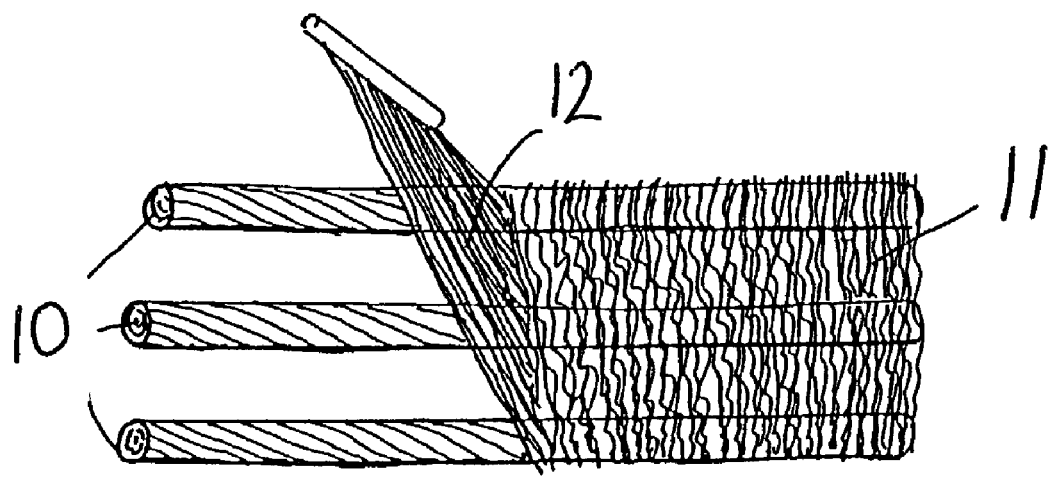
FIG. 3 is a sketch illustrating a portion of one version of a completed composite containing filament rods as produced in accordance with the invention.

FIG. 1 illustrates a three step in-line consolidation procedure for forming multifilament rods of substantially circular cross-section from, in this case, cellulose acetate spun filaments. Spun filaments 1 from a bale 2 of crimped filamentary tow, as is commercially available, are subjected to longitudinal stretching using textile drafting rollers 3. The parallel stretched filaments 4 are then drawn and compressed into an elongate cylindrical form in a tunnel device 5. A compacted three-dimensional structure 6 of substantially circular cross-section results.

This multi-filament structure 6 is held in its desired compacted form by a highly porous water insoluble lightweight nonwoven fabric 7 which is wrapped around the three-dimensional structure 6 and lightly adhered to itself (at 8). An ideal material for this purpose is a wet laid "tea bag" hydroentangled material (as produced by Crompton Plc for example) containing a binder for self-adherence. Such material, at a typical weight of 20 grams per square metre, exhibits superb fluid transmission and wet strength.

Optimum capillarity for resultant wrapped filament rod 9 (FIG. 2) has been obtained using 5 denier cellulose acetate filaments at a controlled packing density of 0.05 grams/cc.

Figure 4:
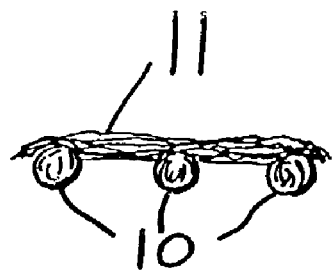
FIG. 4 is an end view of the composite of FIG. 3.

FIGS. 3 and 4 illustrate a composite structure suitable for hygiene applications. Cellulose acetate filament rod assemblies 10 made as described with reference to FIG. 1 are deposited and partially embedded in an airlaid structure 11 (formed at 12) containing pulp, superabsorbent polymer and low temperature binding fibres. The composite product is used with the rod assemblies facing the direction from which fluid is to be received. Such composite structures exhibit fluid distribution by the filament rods 10 to the entire length of the airlaid structure 11 by both longitudinal and lateral liquid spreading. This structure is ideal for incorporation into thin diaper absorbent composites.

What is claimed is:

1. A method of producing a nonwoven textile structure comprising the steps of initially stretching a plurality of substantially parallel continuous tow filaments of absorbent material to provide a partially stabilized filament assembly, further constraining said filament assembly by a bundling or twisting operation to produce a compacted three-dimensional rod or bundle while maintaining substantially uninterrupted capillarity along the entire length of said filament assembly, further constraining each three-dimensional rod or bundle by wrapping each in a web of water porous material, and bonding a spaced array of such resulting wrapped rods or bundles to a carrier layer to form a composite structure.

2. A method of producing a nonwoven absorbent textile structure from a plurality of substantially parallel continuous tow filaments by firstly compacting said filaments into an assembly in the form of a rod or bundle while maintaining substantially uninterrupted capillarity along the length of said assembly, further constraining said rod or bundle by wrapping in a sheath of a water porous web material, and then bonding a spaced array of such wrapped filament assemblies to a carrier layer to form a composite structure.

3. A method of producing a non-woven textile structure comprising the steps of:
    drawing a bundle of filaments, from a bale;
    stretching said bundle, at least lengthways;
    consolidating said bundle into a pack, which may be of substantially circular or rectangular cross-section by passing the bundle through a compression tunnel;
    wrapping said pack in a sheath formed of a water porous web material so as to maintain its cross-sectional dimensions; and
    bonding a plurality of the thus wrapped packs to a carrier layer to form a composite structure.

4. A method according to claim 3 wherein the wrapped packs are cut at intervals and an array of longitudinally and/or transversely spaced apart wrapped packs are bonded to the carrier layer.

* * * * *